(12) United States Patent
Oh et al.

(10) Patent No.: US 12,119,498 B2
(45) Date of Patent: Oct. 15, 2024

(54) ONE-SIDED ELECTRODE WITH REDUCED TWISTING FOR A SECONDARY BATTERY, AND METHOD FOR PRODUCING SAME

(71) Applicant: LG Chem, Ltd., Seoul (KR)

(72) Inventors: Sei Woon Oh, Seoul (KR); Yeo Kyung Yoon, Daegu (KR); Sun Hwak K. Woo, Daejeon (KR); Yu Ra Jeong, Seoul (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/491,083

(22) PCT Filed: Oct. 24, 2018

(86) PCT No.: PCT/KR2018/012632
§ 371 (c)(1),
(2) Date: Sep. 4, 2019

(87) PCT Pub. No.: WO2019/083273
PCT Pub. Date: May 2, 2019

(65) Prior Publication Data
US 2020/0014031 A1    Jan. 9, 2020

(30) Foreign Application Priority Data
Oct. 25, 2017    (KR) .................. 10-2017-0139136

(51) Int. Cl.
*H01M 4/66*    (2006.01)
*H01M 4/02*    (2006.01)
(Continued)

(52) U.S. Cl.
CPC ......... *H01M 4/667* (2013.01); *H01M 4/0404* (2013.01); *H01M 4/0435* (2013.01);
(Continued)

(58) Field of Classification Search
CPC ........ H01M 2004/027; H01M 4/0404; H01M 4/661; H01M 4/669; H01M 4/667
See application file for complete search history.

(56) References Cited

U.S. PATENT DOCUMENTS 4,521,500 A * 6/1985 Watanabe ........... H01M 50/193
                                                      429/185
5,888,670 A    3/1999 Kawakami
(Continued)

FOREIGN PATENT DOCUMENTS

CN         1529883 A    9/2004
CN       104466191 A    3/2015
(Continued)

OTHER PUBLICATIONS

Machine translation of JPH10208710A Yoshihisa reference (cited within IDS) (Year: 1998).*
(Continued)

*Primary Examiner* — Matthew T Martin
*Assistant Examiner* — Jessie Walls-Murray
(74) *Attorney, Agent, or Firm* — MORGAN, LEWIS & BOCKIUS LLP (57) ABSTRACT

The present invention provides a one-sided electrode for a secondary battery comprising a current collector, an electrode mixture layer applied to one surface of the current collector, and an electrode distortion-preventing layer formed on the other surface of the current collector to which no electrode mixture is applied. The one-sided electrode according to the present invention exhibits significantly reduced warping or curling after a rolling process and has the advantages of facilitating subsequent processes and enabling enhanced productivity.

16 Claims, 1 Drawing Sheet

(51) Int. Cl.
  *H01M 4/04* (2006.01)
  *H01M 4/139* (2010.01)
  *H01M 10/0525* (2010.01)

(52) U.S. Cl.
  CPC ........... *H01M 4/139* (2013.01); *H01M 4/661* (2013.01); *H01M 4/668* (2013.01); *H01M 4/669* (2013.01); *H01M 10/0525* (2013.01); *H01M 2004/027* (2013.01)

(56) References Cited

U.S. PATENT DOCUMENTS

| | | | |
|---|---|---|---|
| 2001/0003863 A1* | 6/2001 | Thibault | H01M 10/0431 429/231.95 |
| 2002/0187398 A1* | 12/2002 | Mikhaylik | H01M 4/0402 429/231.95 |
| 2004/0241549 A1 | 12/2004 | Cho et al. | |
| 2005/0208373 A1 | 9/2005 | Davis et al. | |
| 2005/0214648 A1* | 9/2005 | Boulton | H01M 6/12 429/234 |
| 2008/0292963 A1* | 11/2008 | Sato | H01M 4/667 429/218.1 |
| 2009/0090636 A1* | 4/2009 | Feng | C25D 5/34 205/300 |
| 2012/0110836 A1 | 5/2012 | Oh et al. | |
| 2013/0330617 A1* | 12/2013 | Yoshimura | H01G 9/0425 429/211 |
| 2014/0170451 A1* | 6/2014 | Iwasaki | H01M 4/661 429/211 |
| 2014/0370350 A1* | 12/2014 | Kwon | H01M 4/581 429/94 |
| 2014/0377651 A1 | 12/2014 | Kwon et al. | |
| 2015/0044560 A1* | 2/2015 | Ogino | H01M 4/625 427/122 |
| 2015/0155241 A1 | 6/2015 | Uzoh | |
| 2015/0171398 A1 | 6/2015 | Roumi | |
| 2015/0249228 A1 | 9/2015 | Inoue et al. | |
| 2016/0190598 A1* | 6/2016 | Majima | C22C 38/60 429/231.8 |
| 2016/0315346 A1 | 10/2016 | Sasaki et al. | |
| 2016/0329613 A1* | 11/2016 | Kusachi | H01M 4/133 |
| 2017/0155155 A1* | 6/2017 | Abdelmalak | H01M 4/663 |
| 2017/0162877 A1* | 6/2017 | Oda | H01M 4/662 |
| 2018/0198132 A1* | 7/2018 | Liang | H01M 4/663 |
| 2018/0261820 A1 | 9/2018 | Liao et al. | |
| 2020/0194776 A1* | 6/2020 | Kawasaki | H01M 10/0525 |

FOREIGN PATENT DOCUMENTS

| | | | |
|---|---|---|---|
| CN | 105375035 A | 3/2016 | |
| CN | 105529501 A | 4/2016 | |
| CN | 106129327 A | 11/2016 | |
| CN | 1061129327 A | 11/2016 | |
| CN | 107134561 A | 5/2017 | |
| EP | 2858165 A1 | 4/2015 | |
| JP | 05-047375 A | 2/1993 | |
| JP | H06150976 A * | 5/1994 | ............ H01M 10/38 |
| JP | H10208710 A | 8/1998 | |
| JP | 2003-257496 A | 9/2003 | |
| JP | 2004-055502 A | 2/2004 | |
| JP | 2004-327374 A | 11/2004 | |
| JP | 2008-228853 A | 10/2008 | |
| JP | 2009-004363 A | 1/2009 | |
| JP | 2009-081123 A | 4/2009 | |
| JP | 2011-233349 A | 11/2011 | |
| JP | 2012-074166 A | 4/2012 | |
| JP | 2012-146549 A | 8/2012 | |
| JP | 2014-175375 A | 9/2014 | |
| KR | 10-2010-0120239 | 11/2010 | |
| KR | 10-2014-0132307 | 11/2014 | |
| KR | 10-2015-0050131 | 5/2015 | |
| KR | 10-2015-0122965 | 11/2015 | |
| KR | 10-2015-0138052 | 12/2015 | |
| KR | 10-2016-0012368 | 2/2016 | |
| KR | 10-2016-0053535 | 5/2016 | |

OTHER PUBLICATIONS

"Titanium alloys for aerospace structures and engines", Introduction to Aerospace Materials, pp. 202-223 Woodhead Publishing Limited, <https://doi.org/10.1533/9780857095152.202> (Year: 2012).*

"Zinc and its Uses"; AZO Materials, <https://www.azom.com/properties.aspx?ArticleID=749> (Year: 2001).*

"Plastics: Chemical Resistance", Ted Pella, Inc., <https://www.tedpella.com/company_html/PlasticsChemResistance.htm> (Year: 2009).*

"Titanium vs. Steel and Aluminum", Titanium Processing Center, <https://titaniumprocessingcenter.com/titanium-technical-data/titanium-strength-to-weight-comparison/> (Year: 2015).*

Tardio et al., "Comparative study of the native oxide on 316L stainless steel by XPS and ToF-SIMS", J. Vac. Sci. Technol. A 33, 05E122 (2015); https://doi.org/10.1116/1.4927319 (Year: 2015).*

Engineered Materials Solutions (Wickeder Group, "Clad Materials" Brochure, <www.emsclad.com>) (Year: 2016).*

Kataoka et al., "High-strength clad current collector for silicon-based negative electrode in lithium ion battery", Journal of Power Sources, vol. 301, Jan. 1, 2016, pp. 355-361, <https://doi.org/10.1016/j.jpowsour.2015.10.009> (Year: 2016).*

"What is Strength of Stainless Steels—Yield—UTS—Definition" (<https://material-properties.org/what-is-strength-of-stainless-steels-yield-uts-definition/>, accessed Jun. 22, 2022). (Year: 2020).*

Toshio et al. (JP 2012074166 A) English machine translation. Full foreign patent publication document cited and attached in Sep. 4, 2019 IDS. (Year: 2012).*

Inaba et al. (JP 2011233349 A) English machine translation. Full foreign patent publication document cited and attached in Sep. 4, 2019 IDS. (Year: 2011).*

Extended European Search Report issued in corresponding European Patent Application No. 18869984.7 dated Mar. 4, 2020.

Office Action dated Aug. 26, 2020 issued in corresponding Korean Patent Application No. 10-2018-0128076.

Office Action issued in the corresponding Chinese Patent Application No. 201880016156.5 dated Mar. 3, 2022.

Office Action issued in related U.S. Appl. No. 17/366,026 dated Feb. 8, 2023.

Omnexus, Tensile Strength—Definition, Units, Formula & Test Methods, Plastics & Elastomers, Strength at Break Tensile (https://omnexus.specialchem.com/polymer-properties/propeties/strength-at-break-tensile) retrieved on Jun. 16, 2023.

Wikipedia, Polystyrene (https://en.wikipedia.org/w/index.php?title=Polystyrene&oldid=1159283001).

Wikipedia, Polybutylene (https://en.wikipedia.org/w/index.php?title=Polybutylene&oldid=1148226721).

Office Action issued in related U.S. Appl. No. 17/366,026 dated Feb. 8, 2023 (previously submitted).

AZO Materials, "Low Density Polyethylene—LDPE," www.azom.com/articles.aspx?ArticleID=428 (2001).

AZO Materials, "Lithium (Li)—Properties, Applications" www.azom.com/articles.aspx?ArticleID=9101 (2013).

Ulf Nobbmann "Polyolefin—We explain Polyolefins for you," Malvern Panalytical Ltd. www.materials-talks.com/what-are-polyolefins/ (2017).

Office Action issued in related U.S. Appl. No. 17/366,026 dated Jul. 5, 2023.

ProtoXYZ; "Polypropylene (PP)," webpage <https://protoxyz.com/materials/Plastic/Polypropylene_(PP)>, Apr. 15, 2024.

FluoroTherm; "Materials Overview: PVDF Properties," webpage <https://www.fluorotherm.com/technical-information/materials-overview/pvdf-properties/>, Apr. 15, 2024.

PBPSA ,What is PB-1?, "Polybutene Piping Systems Association," webpage < https://www.pbpsa.com/what-is-pb-1>, Apr. 16, 2024.

(56) References Cited

OTHER PUBLICATIONS

Office Action issued in U.S. Appl. No. 17/366,026 dated Apr. 19, 2024.

* cited by examiner

ONE-SIDED ELECTRODE WITH REDUCED TWISTING FOR A SECONDARY BATTERY, AND METHOD FOR PRODUCING SAME

CROSS-REFERENCES TO RELATED APPLICATIONS

This application is a U.S. national phase application, pursuant to 35 U.S.C. § 371, of PCT/KR2018/012632, filed Oct. 24, 2018, designating the United States, which claims priority to Korean Application No. 10-2017-0139136, filed Oct. 25, 2017. The entire contents of the aforementioned patent applications are incorporated herein by this reference.

TECHNICAL FIELD

The present invention relates to a one-sided electrode that improves an occurrence of an electrode being distorted or rolled due to a difference in the current collector and the electrode mixture at the time of rolling process when preparing the one-sided electrode, and a method of preparing the same.

BACKGROUND ART

As technologies for mobile devices are developed, and demand for the mobile devices increases, there has been a rapid increase in demand for secondary batteries as energy sources. Among such secondary batteries, lithium secondary batteries, which exhibit a high energy density and operational potential, a long cycle life, and a low self-discharge rate have been commercialized and widely used.

In recent years, there has been a growing interest in environmental issues, and as a result, electric vehicles (EVs) and hybrid electric vehicles (HEVs), which can replace fossil-fueled vehicles such as gasoline vehicles and diesel vehicles, and the like are widely studied. Although a nickel metal hydride (Ni-MH) secondary battery is generally used as a power source for such an electric vehicle (EV) and a hybrid electric vehicle (HEV), research on using a lithium secondary battery having a high energy density, a high discharge voltage, and an output stability has been actively conducted, and some of them have been commercialized.

The lithium secondary battery has a structure in which a non-aqueous electrolyte containing a lithium salt is impregnated in an electrode assembly having a porous separator interposed between a positive electrode and a negative electrode coated with an active material on an electrode current collector, and the positive electrode, the negative electrode, and the separator are classified based on the structure of the electrode assembly. Representative examples of the electrode assembly include a jelly-roll (wound type) electrode assembly in which positive electrodes and negative electrodes of a long sheet type are wound with a separator interposed therebetween, a (stacked type) electrode assembly in which a plurality of positive electrodes and negative electrodes cut in a predetermined size are sequentially stacked with a separator interposed therebetween, and a stack/folding type electrode assembly having a structure in which a bi-cell or a full cell stacked with predetermined units of positive electrodes and negative electrodes stacked with a separator interposed therebetween is wound.

The manufacturing process of the electrode assembly including the laminated structure of the unit electrodes includes a process of manufacturing positive and negative electrode mixtures, a process of manufacturing sheet-like electrodes composed of a positive electrode and a negative electrode by applying the respective mixtures to a positive electrode current collector and a negative electrode current collector, a process of forming an electrode tab on the electrode, a process of rolling the electrodes, a process of manufacturing an electrode by slitting the electrodes to a desired size, a vacuum drying process, a process for forming an electrode assembly including a positive electrode, a negative electrode and a separator, and the like.

In particular, when a stacked electrode assembly or a stacked/folded electrode assembly is manufactured, a process of stacking single sheets of electrodes upward is required, and thus a process of manufacturing single sheets of electrodes is performed first.

In the case of the double-sided electrode formed by coating the electrode mixture on both sides of the current collector, when the single electrodes are stacked upward, the electrodes located at the lowermost and uppermost ends do not contribute to the performance of the cell because there is no counter electrode. As such, in order to reduce the cost, the electrode of the outermost layer of the electrode assembly has a one-sided electrode coated with an electrode mixture only on one surface of the current collector.

On the other hand, in the production of the one-sided electrode, even when the same pressure is applied to the electrode mixture and the current collector in the rolling process, the electrode sheet is distorted or curled toward the current collector due to the difference in elongation rate after rolling. A distortion or curling of the electrode sheet causes a defect in a subsequent process, and therefore, there is a need for a technology for preventing such a distortion or curling of the electrode sheet when producing a one-sided electrode.

Accordingly, technologies such as minimizing the rolling rate, increasing the thickness of the current collector, or reducing the speed of the pressing process have been proposed, but these have problem of limiting the performance of the battery or increasing the cost.

SUMMARY

Technical Problem

It is an object of the present invention to solve the above-mentioned problems of the prior art and the technical problems required from the past.

Specifically, it is an object of the present invention to provide an electrode capable of improving the convenience of work in a subsequent process and improving productivity by improving the distortion or curling of the electrode due to the strain or elongation difference of the electrode mixture and the current collector during the rolling process for manufacturing the one-sided electrode, and a method of manufacturing the same.

Technical Solution

In order to achieve the above-mentioned objects, a one-sided electrode for a secondary battery according to the present invention includes a current collector, an electrode mixture layer applied on one surface of the current collector, and an electrode distortion-preventing layer formed on the other side of the current collector on which no electrode mixture is applied.

In an embodiment of the present invention, the electrode distortion-preventing layer may be made of a metal that is different from a material of the current collector, and a thickness of the electrode mixture layer may be between 40 μm and 300 μm.

In another embodiment of the present invention, the electrode distortion-preventing layer may be made of an insulating polymer material, and a thickness of the electrode mixture layer may be between 1 μm and 70 μm.

In another embodiment of the present invention, the current collector and the electrode distortion-preventing layer may be integrally formed as a clad metal.

In an embodiment of the present invention, the clad metal may include two or more selected from the group consisting of copper, titanium, nickel, stainless steel, and an alloy thereof.

The clad metal may include copper and stainless steel.

In an embodiment of the present invention, an insulating polymer layer may be further formed on the electrode distortion-preventing layer.

In an embodiment of the present invention, a tensile strength of the electrode distortion-preventing layer may be 80% to 120% of a tensile strength of the electrode mixture layer, In an embodiment of the present invention, the insulating polymer may be made of one or more selected from the group consisting of polyethylene, polypropylene, polybutylene, polystyrene, polyethylene terephthalate, natural rubber, and synthetic rubber.

In an appropriate embodiment of the present invention, the electrode may be a negative electrode.

The present invention also provides a secondary battery including the one-sided electrode.

In order to solve the above-mentioned problems, the present invention provides a method of manufacturing the one-sided electrode for the secondary battery, and the method includes the steps of (a) laminating an electrode distortion-preventing layer on one surface of a current collector and subsequently applying heat and pressure; (b) applying an electrode active material slurry that includes an electrode active material and a solvent on the other surface of the current collector; (c) drying the electrode coated with the electrode active material slurry; and (d) rolling the electrode to have a predetermined thickness.

In an appropriate embodiment of the present invention, a step of applying a polymer solution or attaching a polymer sheet on the electrode distortion-preventing layer may be added between the steps (a) and (b).

Advantageous Effects

As described above, the one-sided electrode for a secondary battery according to the present invention is an electrode that is significantly improved in distortion or curling after the rolling process, thereby improving the convenience of work in a subsequent process.

The method of manufacturing an electrode according to the present invention also has an effect of improving the productivity by preventing the occurrence of curling caused by the rolling process.

DETAILED DESCRIPTION OF THE PREFERRED EMBODIMENTS

Hereinafter, embodiments of the present invention will be described with reference to the drawings. However, the present invention is not limited by the scope of the present disclosure.

Figure 1:
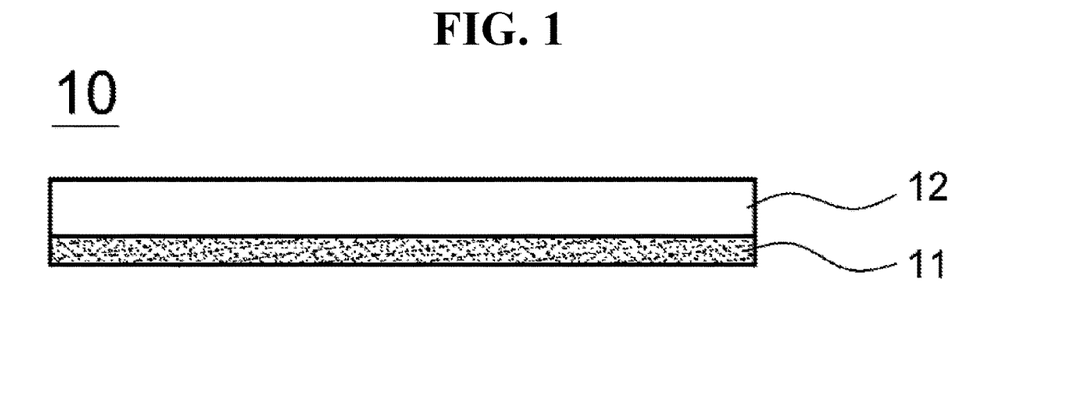
FIG. 1 is a cross-sectional view of a one-sided electrode according to a conventional manufacturing method.
Figure 2:
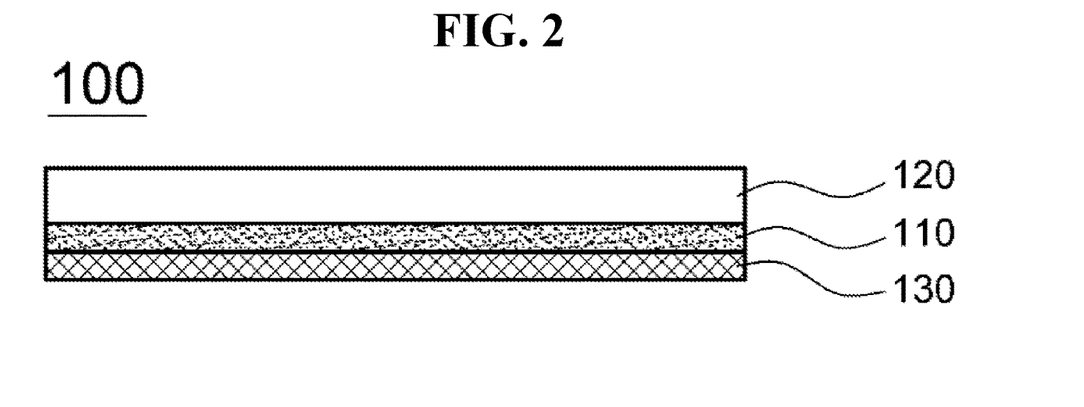
FIG. 2 is a cross-sectional view of a one-sided electrode according to an embodiment of the present invention.

A one-sided electrode 100 for a secondary battery according to the present invention includes a current collector 110, an electrode mixture layer 120 coated on one surface of the current collector, and an electrode distortion-preventing layer 130 formed on the other surface of the current collector where no electrode mixture is coated.

The electrodes for the secondary battery are formed by applying the electrode mixture to the positive electrode current collector and the negative electrode current collector, respectively, to form sheet-shaped electrodes composed of a positive electrode and a negative electrode, and subsequently subjected to a rolling process. The term "electrode mixture" refers to an electrode slurry prepared by mixing an electrode active material, a conductive material, a binder, and the like with a solvent.

Generally, when pressure is applied to an electrode sheet coated with an electrode mixture on a current collector, deformation of the current collector and the electrode mixture occurs. Since the current collector and the electrode mixture have different tensile strengths, there is a difference in strain or elongation when a same force is applied. Further, since there is typically a difference between the thickness of the electrode mixture and the thickness of the current collector, the difference in thickness also affects the strain or elongation due to rolling.

In the case of the double-sided electrode, even though there is a difference in elongation due to rolling between the current collector and the electrode mixture, the electrode mixture is applied to both surfaces of the current collector, which prevents the electrode sheet from being distorted or curled. However, in the case of the one-sided electrode, the electrode sheet is distorted or curled due to the difference in thickness between the current collector and the electrode mixture and due to the difference in the elongation due to rolling.

The present invention is characterized in that an electrode distortion-preventing layer having a tensile strength similar to a tensile strength of an electrode mixture is added to the current collector in order to prevent the electrode sheet from being distorted or curled after the rolling process when preparing a one-sided electrode.

FIG. 2 is a cross-sectional view of a one-sided electrode according to an embodiment of the present invention. Referring to FIG. 2, an electrode mixture layer 120 is coated on one surface of a current collector 110, and an electrode distortion-preventing layer 130 is formed on the opposite surface of the electrode mixture. Even though the electrode assembly layer 120 having a high tensile strength is disposed on one surface of the current collector, since the electrode distortion-preventing layer 130 having a tensile strength similar to a tensile strength of the electrode mixture is disposed on the other surface of the current collector, the difference in strain or elongation due to the rolling between the current collector and the electrode is reinforced by the electrode distortion-preventing layer, thereby preventing the electrode from being distorted or curled.

In the present invention, it is preferable that the material that forms the electrode distortion-preventing layer has a tensile strength similar to a tensile strength of the electrode mixture. Specifically, it may be 80% to 120%, more preferably 85% to 110%, and most preferably 90% to 100% of the tensile strength of the electrode mixture. When the tensile strength of the electrode distortion-preventing layer is less than 80% or more than 120% of the tensile strength of the electrode mixture, it may be difficult to sufficiently remove the occurrence of distortion or curling of the electrode.

The material of the electrode distortion-preventing layer may be a metal or an insulating polymer different from the current collector.

When the amount of the electrode mixture to be loaded is large and the electrode mix layer is relatively thick, it is preferable to form the electrode distortion-preventing layer with a metal material different from the current collector. The case where the electrode mixture layer is relatively thick refers to a case where the thickness of the electrode mixture layer is 40 to 300 μm.

There is no particular limitation on the type of the current collector and the metal material different from the current collector as long as it has a tensile strength similar to a tensile strength of the electrode mixture, without causing chemical changes in the battery. For example, copper; stainless steel; aluminum, nickel; titanium; copper or stainless steel surface-treated with carbon, nickel, titanium, silver, or the like; aluminum-cadmium alloys; and the like may be used. Further, it may be used as various forms such as a film, a sheet, a foil, a net, a porous body, a foam, and a nonwoven fabric.

In the present invention, an insulating polymer other than metal may be selected as the electrode distortion-preventing layer. In the case where the loading amount of the electrode mixture is relatively small and the thickness of the electrode mixture layer is relatively small, the difference in thickness between the current collector and the electrode mixture is small and the difference in elongation due to rolling is small. Accordingly, the insulating polymer as the electrode distortion-preventing layer alone may be sufficient to reinforce the difference in elongation due to rolling. The case where the thickness of the electrode mixture layer is relatively small means that the thickness of the electrode mixture layer is 1 μm to 70 μm.

The insulating polymer that may be used as the distortion-preventing layer is not particularly limited as long as it has chemical resistance to an electrolytic component, and specifically includes one or more selected from the group consisting of polyethylene (PE), polypropylene (PP), polybutylene (PB), polystyrene (PS), polyethylene terephthalate (PET), natural rubber, and synthetic rubber. It is possible to obtain an effect of preventing the short circuit by forming the insulating polymer layer on one surface of the current collector on which no electrode mixture is applied in the one-sided electrode.

The ratio of the thickness of the electrode distortion-preventing layer to the thickness of the electrode mixture layer may be appropriately selected based on the physical properties of the constituent material, the rolling rate, and the like.

In a preferred embodiment of the present invention, the current collector and the electrode distortion-preventing layer may be a clad metal.

The clad metal refers to a metal material of a new nature produced through a hetero-metal bond and a material added with a new characteristic not possessed by the base metal.

Since the clad metal is formed by bonding between dissimilar metals and can have a multi-layered structure, if the clad metal of the multi-layer structure includes a metal that may be used as a current collector such as aluminum, copper, and the like and a metal having a tensile strength similar to a tensile strength of the electrode mixture, the clad metal having such a multi-layer structure may be the current collector and the electrode distortion-preventing layer of the present invention. In other words, in such a case, a part of the clad metal acts as a current collector, and the remaining part becomes a distortion preventing layer.

Such a clad metal itself has a distortion-preventing layer. Therefore, when such a clad metal is used as a current collector, a separate process for forming a distortion-preventing layer is not required.

Methods for producing clad metals are classified into three types, including a hot and cold pressing method, an explosive pressure bonding method, and a resin bonding method. The hot and cold pressing method is a method of applying pressure to the material while passing through the clad equipment to be thereby bonded. The explosive pressure bonding method is a method of joining materials with impact energy generated by explosion of an explosive. In the resin bonding method, a material is bonded using a viscoelastic resin or the like.

Since the clad metal may have a multilayer structure, the thickness ratio of each metal layer may be appropriately adjusted in order to achieve the effects of the present invention. The thickness ratio of each metal layer should take into account the tensile strength and electrical conductivity of the metal itself and the tensile strength of the electrode mixture layer.

As will be described later, the copper current collector has a large elongation/deformation ratio due to rolling. Therefore, the copper material and the clad metal including the stainless steel having a large tensile strength would be most advantageous for attaining the effects of the present invention On the other hand, the one-sided electrode for a secondary battery is typically disposed at the outermost surface of the uppermost and lowermost ends of the electrode assembly, and the current collector of the one-sided electrode surface on which no electrode mixture is applied faces the outer peripheral surface of the electrode assembly, thereby allowing the metal surface of the current collector to be exposed. Therefore, it is preferable to apply the insulating polymer or attach the insulating polymer sheet or film to the surface of the current collector to which no electrode mixture is applied.

In the present invention, when a metal is selected as the distortion-preventing layer on the current collector, an insulating polymer layer may be formed on the distortion-preventing layer to prevent the metal from being exposed.

Figure 3:
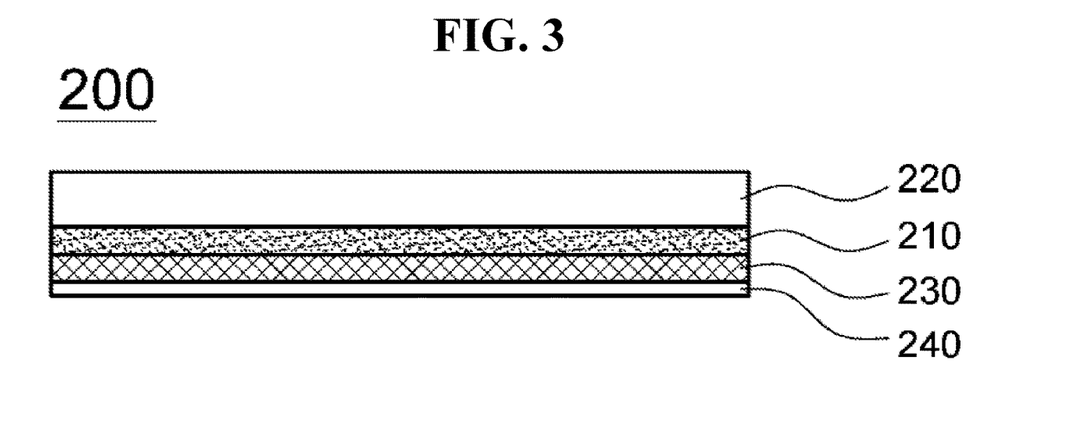
FIG. 3 is a cross-sectional view of a one-sided electrode according to another embodiment of the present invention.

FIG. 3 is a cross-sectional view of a one-sided electrode 200 according to an embodiment of the present invention. Referring to FIG. 3, the one-sided electrode 200 includes a current collector 210, an electrode assembly layer 220 formed on one surface of the current collector, an electrode distortion-preventing layer 230 formed on the other surface of the current collector, and an insulating polymer layer 240 formed on the electrode distortion-preventing layer.

There is no particular limitation on the kind of the insulating polymer as long as it has an insulating property. Examples of the insulating polymer include one or more selected from the group consisting of polyethylene (PE), polypropylene (PP), polybutylene (PB), polystyrene (PS), polyethylene terephthalate (PET), natural rubber, and synthetic rubber.

In the case where the insulating polymer layer is formed on the current collector or the electrode distortion-preventing layer in order to prevent the metal from being exposed due to the metal being the material of the electrode distortion-preventing layer, the thickness of the insulating polymer layer may be 3 to 100 μm, preferably 10 to 80 μm, and more preferably 15 to 60 μm. When the thickness of the insulating polymer layer is less than 3 μm, it is too thin to be easily removed, and when the thickness is greater than 100 μm, it is not preferable from the economical viewpoint.

The insulating polymer layer may be formed on the current collector or the electrode distortion-preventing layer by a known method. Specifically, a polymer solution may be applied, or a polymer sheet may be purchased and attached.

The thickness of the electrode distortion-preventing layer may be appropriately selected based on the physical properties of the material, the thickness of the current collector and the thickness ratio of the electrode mixture, and the difference in elongation due to the rolling of the current collector and the electrode mixture.

In the case where the thickness of the electrode material mixture layer is similar to the thickness of the current collector, and there is little difference in elongation due to rolling, no electrode distortion-preventing layer is required, or the electrode distortion-preventing layer may be adjusted to become significantly thin. On the contrary, when the electrode mixture layer and the current collector have a large difference in thickness, and the difference in elongation due to rolling between them is large, the electrode distortion-preventing layer may be controlled to be thick. However, in terms of economy or production convenience, it is not preferable that the electrode distortion-preventing layer is as thick as the electrode mixture layer.

In the present invention, the electrode may be a positive electrode or a negative electrode, and in particular may be a negative electrode. This is because copper is generally used as a current collector for a negative electrode. In the case of copper, the elongation due to rolling is large due to the characteristics of the material, which may cause a large difference in the elongation after rolling. Accordingly, in the case of a one-sided electrode to which a copper current collector is applied, the electrode distortion-preventing layer of the present invention is significantly useful.

In the present invention, the current collector material is not particularly limited as long as it has electrical conductivity without causing chemical change in the battery. For example, copper; stainless steel; aluminum; nickel; titanium; calcined carbon; copper or stainless steel surface-treated with carbon, nickel, titanium, silver, or the like; aluminum-cadmium alloys; and the like may be used. Further, fine unevenness may be formed on the surface to enhance the binding force of the electrode active material, and it may be used in various forms such as a film, a sheet, a foil, a net, a porous body, a foam, and a nonwoven fabric.

According to an embodiment of the present invention, the current collector is preferably one selected from the group consisting of aluminum, copper, titanium, nickel, stainless steel, and an alloy thereof.

The present invention also provides a secondary battery comprising the electrode.

The kinds of the secondary battery of the present invention are not particularly limited, and specific examples thereof include a lithium ion (Li-ion) secondary battery, a lithium polymer (Li-polymer) secondary battery, and a lithium ion polymer (Li-ion polymer) battery having advantages such as high energy density, discharge voltage, and output stability.

Generally, a lithium secondary battery is composed of a positive electrode, a negative electrode, a separator, and a non-aqueous electrolyte containing a lithium salt.

The positive electrode, for example, may be prepared by applying a mixture of a positive electrode active material, a conductive material, and a binder on a positive electrode current collector and/or an extended current collection unit, followed by drying. If necessary, a filler may be further added to the mixture.

The positive electrode active material may be a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (herein, x is between 0 and 33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}M_xO_2$ (herein, M=Co, Mn, Al, Cu, Fe, Mg, B or Ga, and x=0.01 to 0.3); a lithium manganese compound oxide expressed by $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ in which a part of Li is substituted with an alkaline earth metal ion; disulfide compounds; $Fe_2(MoO_4)_3$; and the like, but not limited thereto.

The conductive material is typically added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whisker such as zinc oxide and potassium titanate; conductive metal oxides such as titanium oxide; and conductive materials such as polyphenylene derivatives and the like.

The binder is added in an amount of 1 to 30% by weight, with respect to the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; and fibrous materials such as glass fibers and carbon fibers.

The negative electrode may be formed by coating a negative electrode active material on a negative electrode collector and/or an extended current collection unit and drying the negative electrode active material. Optionally, the negative electrode may further include the above-described components.

Examples of the negative electrode active material include carbon such as non-graphitized carbon and graphite carbon; metal complex oxide such as $Li_xFe_2O_3(0 \leq x \leq 1)$, $Li_xWO_2(0 \leq x \leq 1)$, $Sn_xMe_{1-x}Me'_yO_2$ (Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene, or the like. When a solid electrolyte such as a polymer is used as the electrolyte, the solid electrolyte may also serve as a separator.

The electrolyte may be a non-aqueous electrolyte containing a lithium salt, and may be composed of a nonaqueous electrolyte and a lithium salt. Examples of the non-aqueous electrolyte include non-aqueous organic solvents, organic solid electrolytes, inorganic solid electrolytes, and the like, but the examples are not limited thereto.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, and the like.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a substance that is soluble in the non-aqueous electrolyte. The examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenylborate, imide, and the like.

For the purpose of improving charge/discharge characteristics, flame retardancy, or the like, pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, or the like may be added to the non-aqueous electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one specific example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

A one-sided electrode for a secondary battery according to the present invention may be manufactured by using the steps of (a) laminating an electrode distortion-preventing layer on one surface of a current collector, followed by applying heat and pressure; (b) applying an electrode active material slurry including an electrode active material and a solvent to the other surface of the current collector; (c) drying the electrode coated with the electrode active material slurry; and (d) rolling the electrode to a predetermined thickness.

In a preferred embodiment of the present invention, it is also possible to prevent the metal from being exposed by further applying a polymer solution on the electrode distortion-preventing layer or attaching the polymer sheet between the steps (a) and (b).

Hereinafter, the present invention will be described in detail with reference to the embodiments of the present invention, but the scope of the present invention is not limited thereto.

Example 1

A clad metal containing copper and stainless steel was prepared (8 μm+12 μm). Thereafter, an electrode slurry (prepared by mixing $LiNi_{0.55}Mn_{0.30}Co_{0.15}O_2$, Denka black as a conductive material and polyvinylidene fluoride as a binder in a weight ratio of 96:2:2, followed by addition of NMP) was applied on the clad metal to have a thickness of 200 μm. Thereafter, it was dried and rolled to produce a cross-section electrode sheet.

Example 2

Stainless steel having a thickness of 12 μm was laminated on one side of a copper foil having a thickness of 8 μm as a current collector, followed by applying heat and pressure to form an electrode distortion-preventing layer. Thereafter, an electrode slurry (prepared by mixing $LiNi_{0.55}Mn_{0.30}Co_{0.15}O_2$, Denka black as a conductive material and polyvinylidene fluoride as a binder in a weight ratio of 96:2:2, followed by addition of NMP) was applied on the other side of aluminum foil to have a thickness of 200 μm. Thereafter, it was dried and rolled to produce a one-sided electrode sheet.

Example 3

A polypropylene solution was applied to a copper foil having a thickness of 8 μm as a current collector to have a thickness of 12 μm and dried to form an electrode distortion-preventing layer. Thereafter, the electrode slurry was coated to have a thickness of 40 μm, followed by drying and rolling to produce a one-sided electrode sheet.

Example 4

A one-sided electrode sheet was produced in the same manner as in Example 1, except that a clad metal (8 μm+12 μm) containing aluminum and stainless steel was used.

Example 5

A one-sided electrode sheet was produced in the same manner as in Example 2, except that aluminum foil was used in place of the copper foil as the current collector.

Example 6

A one-sided electrode sheet was produced in the same manner as in Example 3, except that aluminum foil was used in place of the copper foil as the current collector.

Comparative Example 1

The electrode slurry of Example 1 was applied to a copper foil having a thickness of 20 μm in the same thickness, followed by drying and rolling to produce a one-sided electrode sheet.

Comparative Example 2

The electrode slurry of Example 2 was applied to an aluminum foil having a thickness of 20 μm in the same thickness, followed by drying and rolling to produce a one-sided electrode sheet.

Experimental Example—Measurement of Radius of Curvature

Each of one-sided electrode sheets of Examples 1 to 6 and Comparative Examples 1 and 2 was cut into pieces of 60 mm×60 mm to prepare specimens. The specimen was measured for the degree of vertical rise from the ground (floor), and the radius of curvature of 1 mm was calculated from the ground. The results are shown in Table 1.

TABLE 1

| | Whether there is electrode distortion-preventing layer | Current collector thickness (μm) | Radius of curvature (mm) |
|---|---|---|---|
| Example 1 | Yes | 8 + 12 | 60 |
| Example 2 | Yes | 8 + 12 | 42 |
| Example 3 | Yes | 8 + 12 | 51 |
| Example 4 | Yes | 8 + 12 | 35 |
| Example 5 | Yes | 8 + 12 | 37 |
| Example 6 | Yes | 8 + 12 | 22 |
| Comparative Example 1 | No | 20 | 20 |
| Comparative Example 2 | No | 20 | 14 |

Referring to Table 1, in Examples 1 to 3 and Comparative Example 1, a copper material was included as a current collector, and it can be confirmed that the radius of curvature of the electrode sheets of Examples 1 to 3 are two or more times greater than the radius of curvature of the electrode sheet of Comparative Example 1. Specifically, the thickness (20 μm) of the electrode of Comparative Example 1 and the thickness (20 μm=8 μm+12 μm) of the current collector including the electrode distortion-preventing layer added to the current collectors of Examples 1 to 3 are the same as 20 μm, but the electrodes of Examples 1 to 3 were significantly improved in curling of the electrode sheet due to the electrode distortion-preventing layer added to the current collector. It is understood that this effect is further maximized when the clad metal is used as in Example 1. The radius of curvature measurement results of Examples 4 to 6 and Comparative Example 2 also show the same tendency as above.

As a result, the cross-section electrode of the present invention has an effect of improving the curling of the electrode sheet due to the electrode distortion-preventing layer added to the current collector, and it is expected that the convenience of the work in the subsequent process is improved, and the productivity is increased.

DESCRIPTION OF SYMBOLS

10: conventional one-sided electrode
11: current collector
12: electrode mixture layer
100, 200: one-sided electrode an embodiment of the present invention
110, 210: current collector
120, 220: electrode mixture layer
130: electrode distortion-preventing layer
240: insulating polymer layer

The invention claimed is:

1. A lithium secondary battery comprising a one-sided electrode, comprising:
a current collector;
an electrode mixture layer applied on one surface of the current collector, wherein a surface of the electrode mixture layer opposing the one surface of the current collector is exposed;
an electrode distortion-preventing layer disposed on an entire surface of an other side of the current collector on which no electrode mixture is applied such that the current collector is not exposed; and
an insulating polymer layer disposed on the electrode distortion-preventing layer on a surface of an other side of the electrode distortion-preventing layer on which no current collector is disposed,
wherein the electrode includes only one current collector,
the electrode mixture layer comprises an electrode active material, a conductive material, and a binder,
the electrode distortion-preventing layer is made of a metal that is different from a material of the current collector,
the insulating polymer layer is disposed on an entire surface of the electrode distortion-preventing layer,
the current collector includes copper, the electrode distortion-preventing layer does not include nickel,
the electrode distortion-preventing layer includes stainless steel or titanium, and
a thickness of the electrode distortion-preventing layer is thicker than a thickness of the current collector.

2. The lithium secondary battery of claim 1, wherein a thickness of the electrode mixture layer is between 40 μm and 300 μm.

3. The lithium secondary battery of claim 1, wherein the current collector and the electrode distortion-preventing layer are integrally formed as a clad metal.

4. The lithium secondary battery of claim 3, wherein the clad metal includes two or more selected from the group consisting of copper, titanium, nickel, stainless steel, and an alloy thereof.

5. The lithium secondary battery of claim 3, wherein the clad metal includes copper and stainless steel.

6. The lithium secondary battery of claim 1, wherein a tensile strength of the electrode distortion-preventing layer is 80% to 120% of a tensile strength of the electrode mixture layer.

7. The lithium secondary battery of claim 1, wherein the insulating polymer is made of one or more selected from the group consisting of polyethylene, polypropylene, polybutylene, polystyrene, polyethylene terephthalate, natural rubber, and synthetic rubber.

8. The lithium secondary battery of claim 1, wherein the electrode is a negative electrode.

9. The lithium secondary battery of claim 1, wherein the one-sided electrode includes only one insulating polymer layer.

10. The lithium secondary battery of claim 1, wherein the electrode mixture layer does not include a silicon alloy.

11. The lithium secondary battery of claim 1, wherein the insulating polymer layer comprises polybutylene (PB), polystyrene (PS), natural rubber or synthetic rubber.

12. The lithium secondary battery of claim 1, wherein the insulating polymer layer is directly disposed on the entire surface of the electrode distortion-preventing layer.

13. The lithium secondary battery of claim 1, wherein the electrode distortion-preventing layer includes stainless steel.

14. The lithium secondary battery of claim 1, wherein the electrode distortion-preventing layer includes titanium.

15. A method of manufacturing the lithium secondary battery according to claim 1, comprising the steps of:
 (a) laminating the electrode distortion-preventing layer on the one surface of the current collector and subsequently applying heat and pressure;
 (b) applying an electrode active material slurry including an electrode active material and a solvent on the other surface of the current collector;
 (c) drying the electrode coated with the electrode active material slurry; and
 (d) rolling the electrode to have a predetermined thickness.

16. The method of claim 15, further comprising a step of applying a polymer solution or attaching a polymer sheet on the electrode distortion-preventing layer between the steps (a) and (b).

* * * * *